United States Patent
Schwarz et al.

(10) Patent No.: US 6,837,661 B2
(45) Date of Patent: Jan. 4, 2005

(54) DETACHABLE INSERT CONNECTION ARRANGEMENT FOR A RETAINING CHANNEL AND METHOD OF CONNECTING

(75) Inventors: Helmut Schwarz, Weil der Stadt (DE); Bernhard Homner, Calw (DE)

(73) Assignee: Schwarz Verbindungs-Systeme GmbH, Althengstett (DE)

( * ) Notice: Subject to any disclaimer, the term of this patent is extended or adjusted under 35 U.S.C. 154(b) by 0 days.

(21) Appl. No.: 10/368,637

(22) Filed: Feb. 20, 2003

(65) Prior Publication Data

US 2003/0156919 A1 Aug. 21, 2003

(30) Foreign Application Priority Data

Feb. 21, 2002 (DE) ..................................... 202 02 681 U (51) Int. Cl.⁷ ............................. F16B 21/00; B25G 3/00
(52) U.S. Cl. ........................... 411/552; 411/84; 411/553
(58) Field of Search ............................. 411/84, 85, 349, 411/549, 551, 552, 553

(56) References Cited

U.S. PATENT DOCUMENTS

| | | | | |
|---|---|---|---|---|
| 5,062,752 A | * | 11/1991 | Takaguchi | 411/552 X |
| 5,370,488 A | * | 12/1994 | Sykes | 411/85 X |
| 5,593,265 A | * | 1/1997 | Kizer | 411/552 |
| 5,632,586 A | * | 5/1997 | Nyholm | 411/552 |
| 6,520,725 B1 | * | 2/2003 | Valeij | 411/553 |

FOREIGN PATENT DOCUMENTS

| | | |
|---|---|---|
| DE | 19617750 | 10/1997 |
| DE | 19900267 | 7/2000 |
| EP | 604361 | 6/1994 |

OTHER PUBLICATIONS

English Language Translation of Abstract of DE 196 17 750.
English Language Translation of Abstract of DE 199 00 267.
English Language Translation of Abstract of E.P.O. 604 361.
* cited by examiner Primary Examiner—Neill Wilson
(74) Attorney, Agent, or Firm—Greenblum & Bernstein, P.L.C.

(57) ABSTRACT

A detachable insert connection arrangement adapted to be connected to a retaining channel having a slot-like opening between two retaining edges and method of connecting a component to a retaining channel. The connection arrangement includes a holder having a push-in part that includes a locking element. The push-in part is capable of being pushed into the retaining channel. A rotation pin is coupled to the locking element. The locking element is at least partially rotatable in two directions. A spring biases the locking element towards a locking position such that when the locking element is arranged in the retaining channel, the locking element bridges the slot and engages an inside of the two retaining edges. The locking element is movable, upon movement of the rotation pin against a biasing force of the spring, to a non-locking position, whereby the push-in part can be removed from the retaining channel. This abstract is neither intended to define the invention disclosed in this specification nor intended to limit the scope of the invention in any way.

25 Claims, 8 Drawing Sheets

DETACHABLE INSERT CONNECTION ARRANGEMENT FOR A RETAINING CHANNEL AND METHOD OF CONNECTING

CROSS-REFERENCE TO RELATED APPLICATIONS

The present application claims priority under 35 U.S.C. §119 of German Patent Application No. 202 02 681.7, filed on Feb. 21, 2002, the disclosure of which is expressly incorporated by reference herein in its entirety.

BACKGROUND OF THE INVENTION

1. Field of the Invention

The invention relates to a detachable insert connection arrangement for a retaining channel and method of connecting a component to a retaining channel.

2. Discussion of Background Information

A retaining channel (see FIG. 2), of the type which may be used with the invention, has a slot S and retaining edges 1-1, 1-2 arranged on both sides of the slot S.

Figure 11:
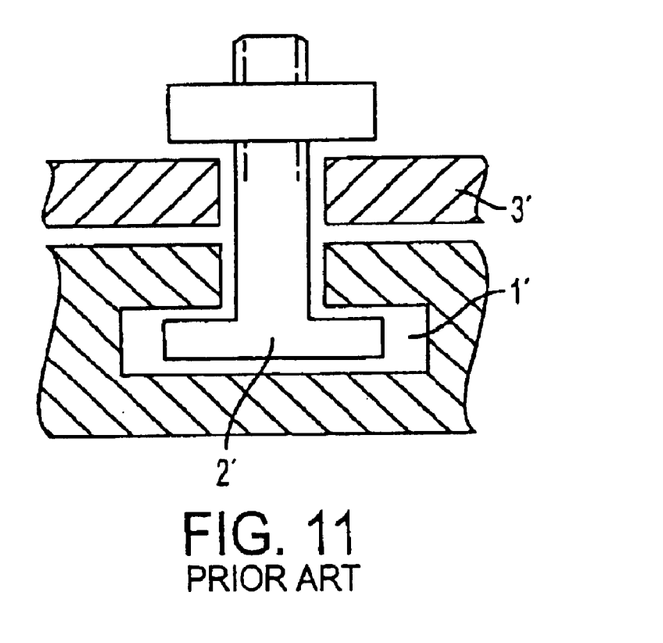
FIG. 11 shows a diagrammatic sectional view of a retaining-channel fastening device for a workbench as known in the prior art.

According to the prior art, workpieces (among other things) can be attached to workbenches for machining (FIG. 11). According to this technique, the head of a retaining pin 2' is pushed into the retaining channel 1'. The workpiece 3' is thus held (by screwing) tightly by way of the retaining pin so that it can be machined.

Published German document DE 199 00267 A 1 discloses a known device fort attaching a first part to a fixed second part. The device has a push-in part which is pushed into the slot of a retaining channel, and a locking element that is arranged to turn on a rotation pin. When the push-in part is inserted into the retaining channel, the rotation pin is pushed manually further into the retaining channel against the force of a spring. The locking part connected to the rotation pin moves out of a non-locking position (restricted by stops), and can be turned into the locking position by turning the pin. In the locking position, the locking element bridges the slot of the retaining channel on the inside of the retaining edges.

Among the disadvantages of an arrangement of this type is the fact that a tool (for example a screwdriver) is required to press and then turn the rotation pin in order to make the connection.

In order to eliminate this disadvantage, the invention provides a detachable insert connection arrangement for a retaining channel which allows it to be used without the assistance of a tool.

SUMMARY OF THE INVENTION

The invention provides for a detachable insert connection arrangement for a retaining channel with a slot-type opening between two retaining edges. The insert connection arrangement has a holder with a push-in part with a locking element which can be pushed into the retaining channel. A rotation pin with a push-in part is provided on this locking element which is capable of turning. The locking element can be brought into a locking position by a spring which bridges the slot on the inside of the retaining edges. The locking element, by turning the rotation pin against the force of the spring, can be brought into a non-locking position in which the push-in part is detachable from the retaining channel.

The locking element can have two wings arranged in the form of a propeller. Each wing of the locking element may have a slide taper. When the push-in part is pushed into the retaining channel, each slide taper can be pressed against the edges of the slot in such a way that the locking element can be turned against the force of the spring into a position where it can be pushed through the slot.

The holder can comprise a part for connecting to a component. The spring acting on the locking element may be a spiral torsion spring. The spiral torsion spring is arranged on the rotation pin. The rotation pin and the locking element may have a thread for screwing them together. In this way, the locking element can be attached to the inside of the retaining edges.

The locking element may be connected with a double-armed ejector leaf spring which can be turned with the locking element. The free ends of the spring arms, when in the non-locking position, can press against the edge of the slot in such a way that the insert connection arrangement can be pressed wholly or partially out of the slot.

The push-in part may have at least one guide element which can be fitted into the slot to align the insert connection arrangement to the retaining channel. The push-in part has two guide elements which can be fitted into the slot to align the insert connection arrangement to the retaining channel. The locking element which can be turned around the axis of the rotation pin is arranged between these guide elements. A damping part can be arranged between the component-connection part and the other parts of the insert connection arrangement. The damping part has damping buffers which lie against the outer sides of the retaining edges of the insert connection arrangement when connected with the retaining channel. The locking element may have stops for the edge of the slot which limit its turning movement. The locking element may have stops for a recess in the holder which limit its turning movement.

The invention also provides for a detachable insert connection arrangement adapted to be connected to a retaining channel having a slot-like opening between two retaining edges, wherein the connection arrangement comprises a holder having a push-in part that includes a locking element. The push-in part is capable of being pushed into the retaining channel. A rotation pin is coupled to the locking element. The locking element is at least partially rotatable in two directions. A spring biases the locking element towards a locking position such that when the locking element is arranged in the retaining channel, the locking element bridges the slot and engages an inside of the two retaining edges. The locking element is movable, upon movement of the rotation pin against a biasing force of the spring, to a non-locking position, whereby the push-in part can be removed from the retaining channel.

The locking element may have two wings which resemble a propeller. Each wing may have a slide taper. When the push-in part is pushed into the retaining channel, each slide taper may be adapted to be pressed against edges of the slot in such a way that the locking element can be turned against the biasing force of the spring into a position where the push-in part can be pushed through the slot. The holder may comprise a part for connection to a component. The spring may comprise a spiral torsion spring. The spiral torsion spring may be mounted about the rotation pin. The rotation pin and the locking element may be threadably connected to each other. The locking element may be capable of clamping against the inside of the retaining edges based upon relative movement between the rotation pin and the locking element.

The arrangement may further comprise a double-armed ejector leaf spring. The locking element may be coupled to the double-armed ejector leaf spring, whereby the double-armed ejector leaf spring can be turned or rotated with the locking element. The double-armed ejector leaf spring may comprise spring arms which, in the non-locking position, press against edges of the slot in such a way that the arrangement can be pressed wholly or partially out of the slot. The push-in part may comprise at least one guide element adapted to be fitted into the slot, whereby the at least one guide element acts to align the arrangement to the retaining channel. The at least one guide element may comprise two guide elements, and wherein the locking element is mounted to rotate about an axis arranged between the two guide elements.

The arrangement may further comprise a damping part. The damping part may be mounted to the holder. The damping part may comprise damping buffers adapted to engage outer sides of the retaining edges when the arrangement is connected with the retaining channel. The locking element may comprise stops that are adapted to engage edges of the slot, whereby the stops act to limit a turning or rotating movement of the locking element. The locking element may comprise stops that are adapted to engage surfaces of a recess of the holder, whereby the stops act to limit a turning or rotating movement of the locking element.

The invention also provides for a detachable insert connection arrangement adapted to be connected to a retaining channel having an opening and retaining edges, wherein the connection arrangement comprises a holder having a first portion that is adapted to be inserted through the opening and a second portion adapted to be connected to a component. A locking element can at least partially rotate in each of a locking direction and an unlocking direction. The locking element comprises wings. The wings have slide tapers and edges which can releasably engage the retaining edges. A pin is coupled to the locking element. A biasing mechanism biases the locking element towards a locking position wherein the edges of the locking element can engage an inside surface of the retaining edges. The locking element is movable in the second direction wherein the edges disengage from the retaining edges. When the first portion is pushed into the retaining channel, each slide taper is adapted to be pressed against edges of the opening in such a way that the locking element can be turned against the biasing force of the biasing mechanism into a position where the first portion can be pushed through the opening.

The invention also provides for a detachable insert connection arrangement adapted to be connected to a retaining channel having an opening and retaining edges, wherein the connection arrangement comprises a holder having a first portion that is adapted to be inserted through the opening and a second portion adapted to be connected to a component. A locking element can at least partially rotate in each of a locking direction and an unlocking direction. The locking element comprises wings. The wings have slide tapers and an edges which can releasably engage the retaining edges. A pin extends though the holder and is coupled to the locking element. A biasing mechanism is mounted about the pin and biases the locking element towards a locking position wherein the edges of locking element can engage an inside surface of the retaining edges. The locking element is movable to the unlocking direction upon rotation of the pin in one direction whereby the edges of the wings disengage from the retaining edges. The locking element is movable, parallel to an axis of the pin upon rotation of the pin in another direction, to a clamping position wherein the edges clamp against the retaining edges. When the first portion is pushed into the retaining channel, each slide taper is adapted to be pressed against edges of the opening in such a way that the locking element can be rotated against the biasing force of the biasing mechanism into a position where the first portion can be pushed through the opening.

The invention also provides for a method of connecting a component to a retaining channel using the insert connection arrangement of the type described above wherein the method comprises inserting the push-in part into the retaining channel and allowing the locking element to at least partially rotate until the locking element bridges the slot and engages an inside of the two retaining edges.

The method may further comprise moving the rotation pin against a biasing force of the spring and removing the push-in part from the retaining channel.

The invention also provides for a method of connecting a component to a retaining channel using the insert connection arrangement of the type described above wherein the method comprises inserting the push-in part into the retaining channel, allowing the locking element to at least partially rotate until the locking element bridges the slot and engages an inside of the two retaining edges, and rotating the rotation pin in one direction until the locking element clamps against an inside of the two retaining edges.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of embodiments of the present invention, in which like reference numerals represent similar parts throughout the several views of the drawings, and wherein:

FIGS. 3A to 3C show various perspective views of the insert connection arrangement in accordance with the invention wherein

FIGS. 5A to 5D show various views of the locking element in various positions wherein:

FIGS. 8A to 8C show various views of the main body wherein:

FIGS. 9A to 9B show various perspective views of the damping part for the main body wherein:

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 2:
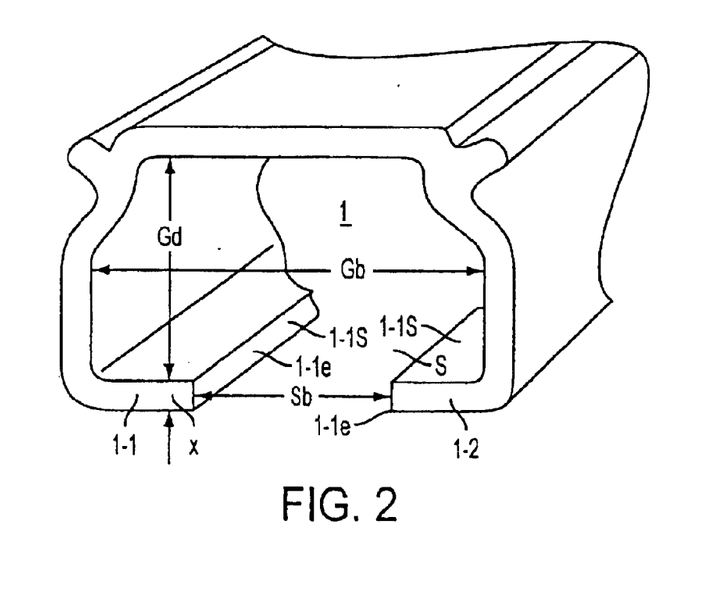
FIG. 2 shows a perspective section view of the rail with a retaining-channel profile as shown in FIG. 1.

FIG. 2 shows a perspective section view of a rail with retaining-channel 1 profile. The retaining channel has two lateral retaining edges 1-1 and 1-2 arranged on both sides of the slot S. The slot S has a width Sb. The retaining edges 1-1 and 1-2 have a thickness "x". The interior channel has a width Gb and a depth Gd. It should be noted that the invention can also be used with other retaining channel configurations such as, e.g., a retaining channel without a rail profile or one that is made by milling a workpiece to the required shape. The retaining channel can be made of any desired material such as, e.g., metal (e.g., aluminum, steel, iron, etc.) or plastic.

Figure 1:
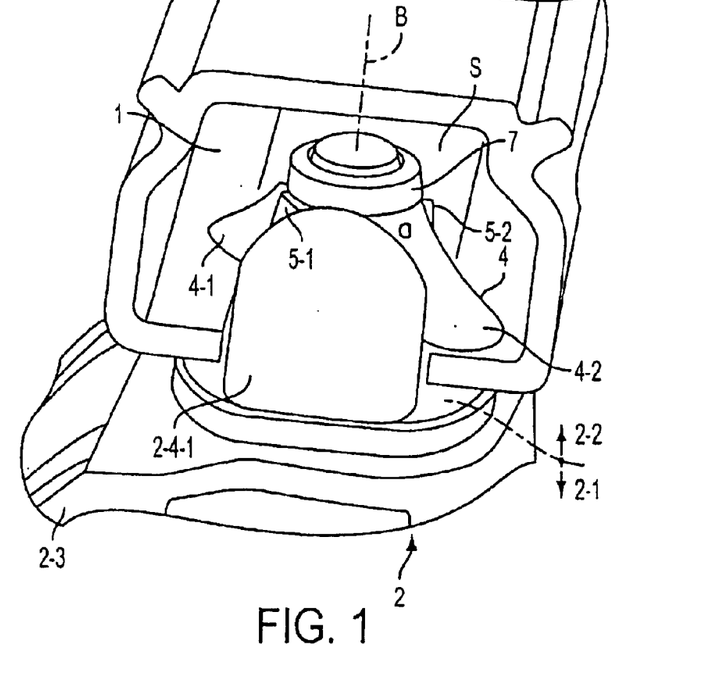
FIG. 1 shows a perspective section view of a rail with a retaining-channel profile connected to the insert connection arrangement in accordance with the invention.

FIG. 1 shows a perspective section view of a rail with a retaining-channel 1 profile, in accordance with FIG. 2, that is connected to an insert connection arrangement 2. The insert connection arrangement 2 comprises a holder portion 2-1 (arranged beneath the outside of the retaining edges 1-1 and 1-2) and a push-in portion 2-2 projecting into the retaining channel 1. Details of the holder 2-1 and the push-in part 2-2 will be more fully described in connection with FIGS. 3A, 3B, 3C, 7, 8A, 8B and 8C.

In FIG. 1 it can be seen that the push-in part 2-2 has a guide element 2-4-1 (and guide element 2-4-2) connected to the holder 2-1. The guide element 2-4-1 allows the insert connection arrangement 2 to be aligned when the push-in part 2-2 is inserted into the retaining channel 1. The maximum width of this guide element 2-4-1 (and 2-4-2) is slightly less than the width Sb of the slot S. In the top part, the guide elements 2-4-1 and 2-4-2 have a conical taper which, when the push-in part 2-2 is inserted into the slot S, produces a "centering" alignment of the push-in part 2-2 relative to an imaginary center of the slot S.

In addition, FIG. 1 shows a locking element 4 which can be turned around an axis B of a rotation pin 3. The head 3H of the rotation pin 3 (see FIG. 3A) is accessible on the underside of the holder 2-1 and can be operated from there.

The locking element 4, (which can be made of any desired material but is preferably made of metal, especially aluminum or stainless steel) has two wings 4-1, 4-2. These have a shape which resemble a propeller. In the locking or locked position, the ends of the wings 4-1 and 4-2 bridge the slot S on the inside of the retaining edges 1-1 and 1-2. The locking element 4 achieves this locking position automatically through the effect of a torsion spring 6 that is arranged on the rotation pin 3 (see FIG. 4). By turning or rotating the pin 3 against the force (i.e., rotating in a direction opposite to the biasing force) of the torsion spring 6, the locking element 4 can be turned into a non-locking or non-locked position. In this position, the ends of the wings 4-1 and 4-2 do not bridge the slot S, but are instead aligned in a generally lengthwise direction (i.e., generally parallel to the slot S), in such a way that the push-in part 2-2 and the locking part 4 can be released from the retaining channel 1.

Figure 10:
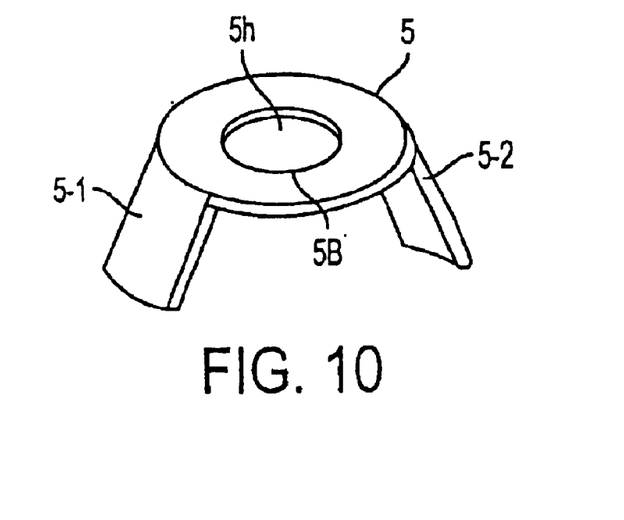
FIG. 10 shows a perspective view of the ejection spring.

This process is aided by the use of a double-armed ejection leaf spring 5 (FIG. 10). This spring 5 forms a sort of saddle over the narrow side of the locking element 4. In the installed position, the free arms 5-1 and 5-2 of the leaf spring 5 point diagonally downwardly. The ends 5-1 and 5-2 project slightly from the locking element 4 in such a way that they press against the outer edges 1-1e and 1-1e' of the slot S in the non-locking position (see FIG. 2). They also act to force the push-in part 2-2 at least partially out of the retaining channel 1. In this way, after the connection has been released, the locking element 4 can be prevented from turning back into the locking position within the channel 1.

Figure 3A:
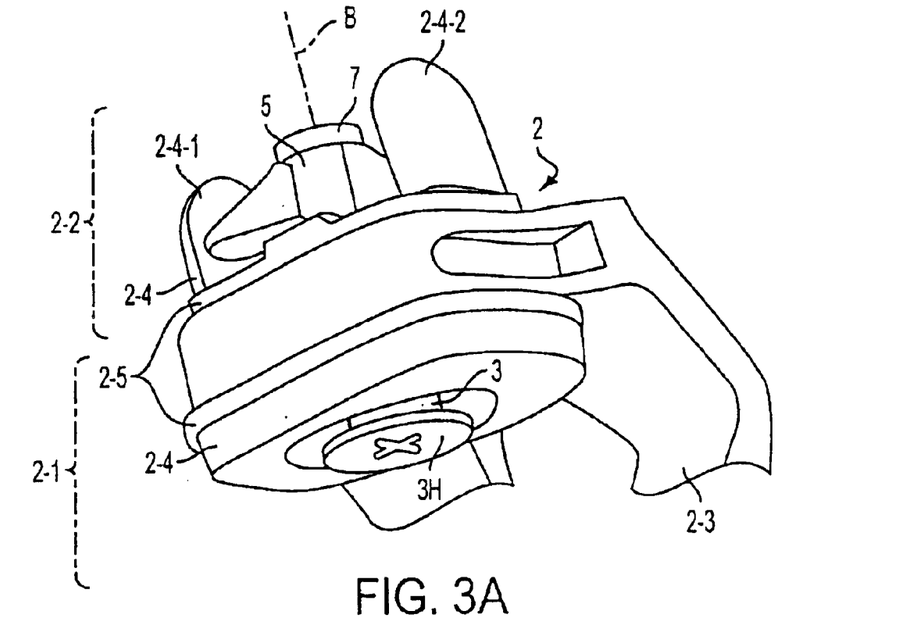
FIG. 3A is a diagonal view of the lower part.
Figure 3B:
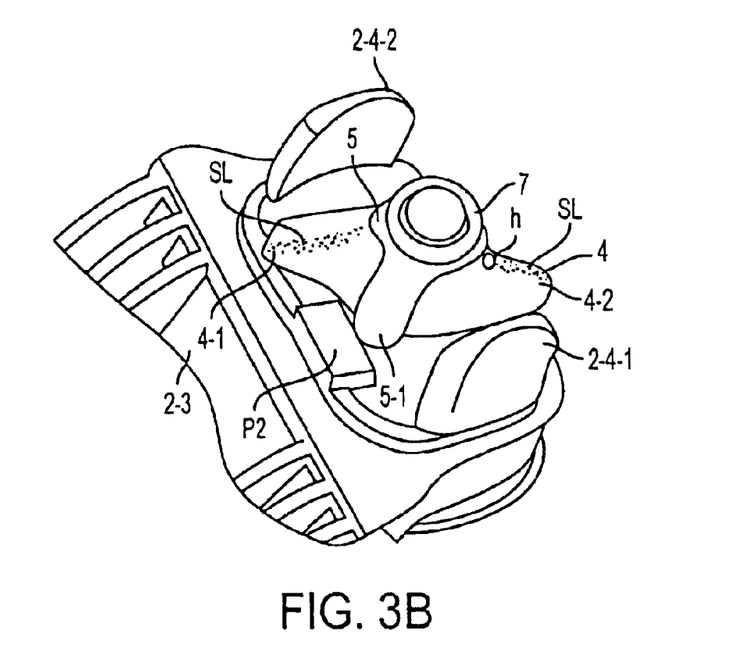
FIG. 3B is diagonal view of the upper part.
Figure 3C:
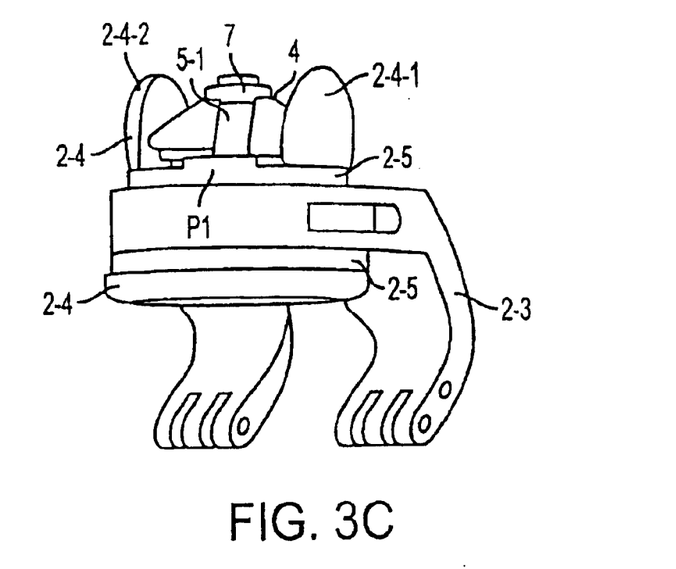
FIG. 3C is perspective view approximately from the side.
Figure 8A:
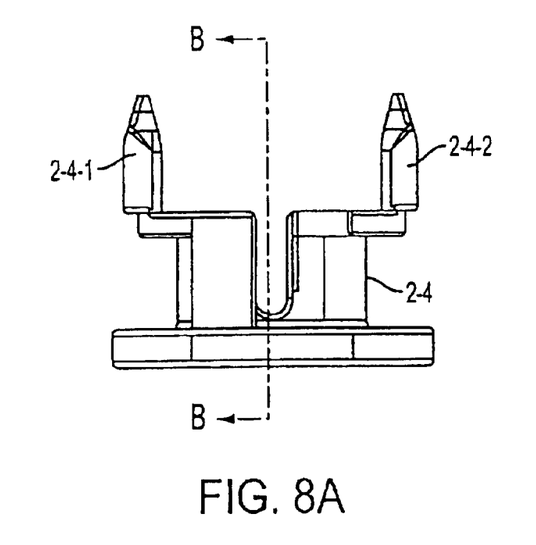
FIG. 8A is a front view.
Figure 8B:
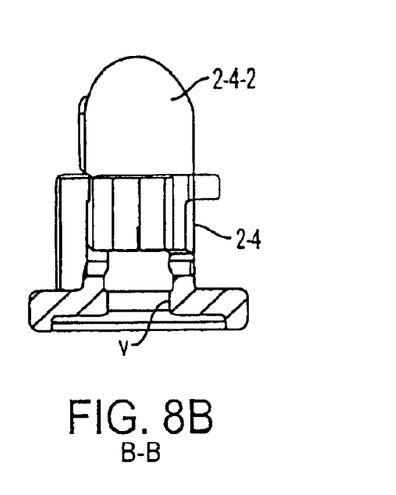
FIG. 8B is a side view with part section B—B as shown in FIG. 8A.
Figure 8C:
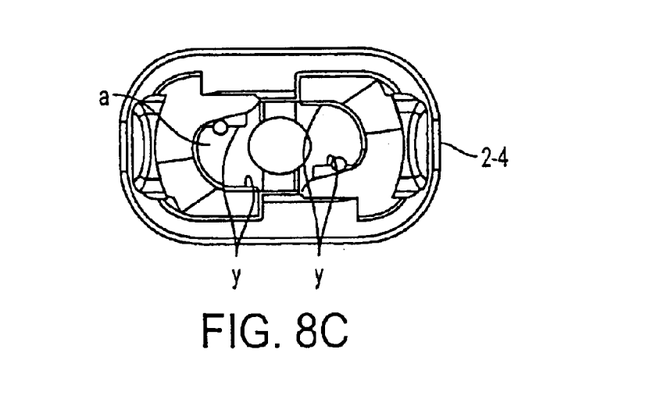
FIG. 8C is a view from above.
Figure 9A:
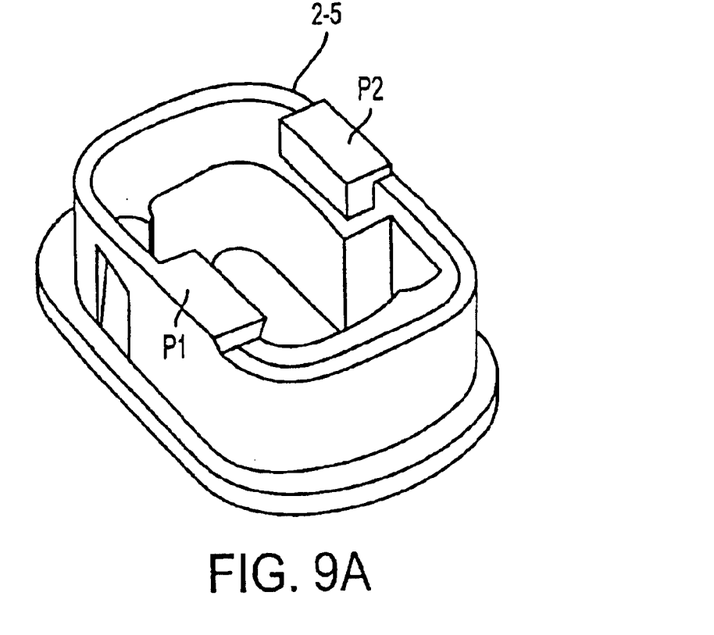
FIG. 9A is a view diagonally from above.
Figure 9B:
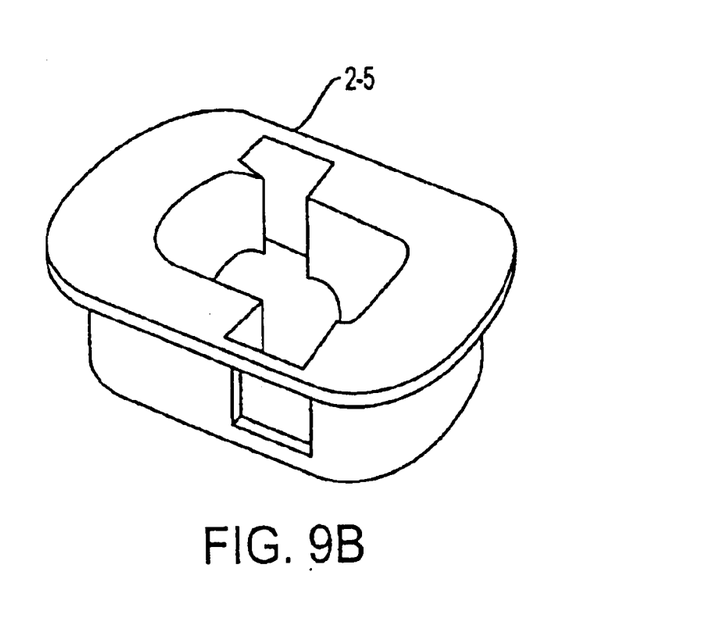
FIG. 9B: view diagonally from beneath.

The holder 2-1 of the insert connection arrangement 2 comprises a main body 2-4 (FIG. 7, FIGS. 8A, 8B and 8C), a component-connection part 2-3 (for connection to a component, e.g. via a bolt), and a damping part 2-5 (FIG. 3C, FIG. 9A and FIG. 9B).

It should be noted that the invention contemplates a device wherein the component can be connected directly to the main body 2-4.

FIGS. 3A to 3C show various perspective views of the insert connection arrangement in accordance with the invention as shown in FIG. 1. FIG. 3A shows a view diagonally from below. In this view, it can be seen that the push-in part 2-2 has two guide elements 2-4-1 and 2-4-2. The locking element 4 is arranged between these guide elements 2-4-1 and 2-4-2 and is mounted on a rotating bolt 3 which rotates about a rotating-bolt axis B. These two guide elements 2-4-1 and 2-4-2 ensure the safe alignment of the insert connection arrangement 2 with the center of the slot S when the push-in part 2-2 is inserted into the slot S of the retaining channel 1.

Through the action of the torsion spring 6 (see FIG. 4), which is arranged on the rotating bolt 3, the locking element 4 takes a position corresponding to the locking position. This is the case even when the insert connection arrangement 2 is not connected with the retaining channel 1. In this position, the ends of the wings 4-1 and 4-2 of the locking element 4 extend beyond the imaginary width of the slot S, in such a way that if no special measures were taken, they would prevent the push-in part 2-2 from being inserted through the slot S into the retaining channel 1.

The torsion spring 6 (FIG. 4) is arranged on the axis of the rotation pin 3. One end of the spring 6 is positioned in a hole "h" (see FIG. 4, FIG. 5C) on the locking element 4. Another end of the spring 6 is supported in a recess of the holder. Alternatively, this end can be connected to the holder directly.

As mentioned above in connection with FIG. 1, by turning the pin 3 manually against the biasing force of the spring 6, the locking element 4 can be placed, moved, or otherwise rotated to a position corresponding to the non-locking position. This position is important for detaching the insert connection arrangement 2 from the retaining channel 1.

When inserting the push-in part 2-2 into the slot S of the retaining channel 1, one needs to ensure that the locking element 4 is placed in a position corresponding to the non-locking position, as otherwise it would not be possible to insert the locking element 4 through the slot S.

Although this positioning could be achieved by turning the rotation pin 3 manually, the invention provides that the push-in process itself ensures that the locking element 4 automatically assumes a position which allows it to pass through the slot S.

To ensure that this can occur, the locking element 4 is formed with a special shape (FIGS. 3B, 4, 5A, 5B and 5C). In this regard, each of the wings 4-1, 4-2 has a slide taper (SL), which, on inserting the push-in part 2-2 into the retaining channel 1, is pressed against the outer edges 1-1$e$ and 1-1$e'$ of the slot S. When this occurs, the locking element 4 is caused to turn, against the force of the spring 6, and therefore assumes a position which allows it to pass through the slot S.

As soon as the push-in process (for which no special tool is required, as the push-in part only has to be pressed into the retaining channel) is completed, the wings 4-1 and 4-2 of the locking element 4 (which are actuated by the force of the torsion spring) turn across the inside of the retaining edges 1-1, 2-2 (FIG. 1) into the locking or locked position. When this occurs, the connection between the retaining channel 1 and the insert connection arrangement 2 takes place.

FIG. 3A shows an embodiment with a push-in part 2-2 (as in FIG. 1), a holder 2-1, a main body 2-4, a component-connection part 2-3, a damping part 2-5 and an ejection leaf spring 5.

FIG. 3B shows a view of the insert connection arrangement diagonally from above. The individual parts are marked in the same way as in FIG. 3A. The view in FIG. 3B best illustrates the action of the slide tapers SL. In FIG. 3B, the tapered surfaces are indicated by dots. However, this is intended only as an aid. In practice, the slide taper is a slightly arched surface designed to ensure optimum turning of the locking element 4 when the wings 4-1 and 4-2 are pressed against the outer edges 1-1$e$ and 1-1$e'$ of the slot S when the push-in part 2-2 is inserted into the retaining channel 1.

FIG. 3C shows a perspective view of the insert connection arrangement 2 approximately from the side. The individual parts are marked identically as in FIGS. 3A and 3B. This diagram shows a possible design for the component connection part 2-3, e.g. one with two comb-like arms which are joined to the component by pins.

Figure 4:
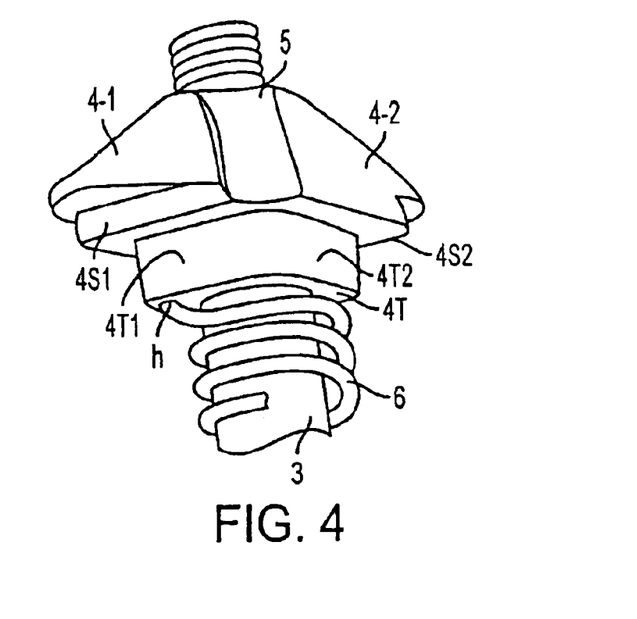
FIG. 4 shows a perspective view of the locking element arranged to turn on the rotation pin.

FIG. 4 shows a perspective detail view of the locking element 4 arranged to turn on the rotation pin 3. The locking element 4 is subjected to the force of a spiral torsion spring 6 which turns it into the locking position. Furthermore, the locking element 4 has stop surfaces 4S1 and 4S2 (4S2 in the back position) which, when the locking element 4 turns after the insert connection arrangement 2 is connected to the retaining channel 1, encounter the insides 1-1$s$ (not shown in FIG. 4) of the retaining edges 1-1 and 1-2 (see FIG. 2), thereby restricting the turning or rotating movement. On encountering the retaining edges 1-1$e$ and 1-1$e'$, an audible click is produced which indicates that the device is in the locked position.

Figure 5A:
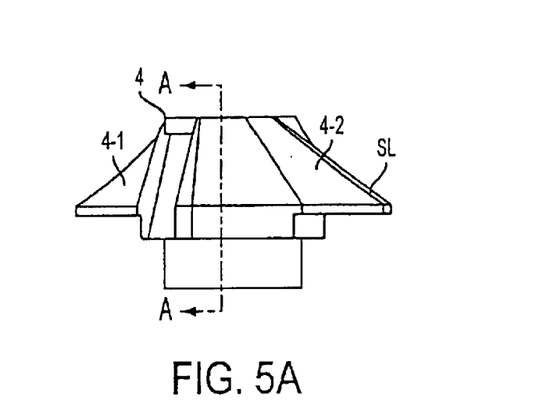
FIG. 5A is a front view.
Figure 5B:
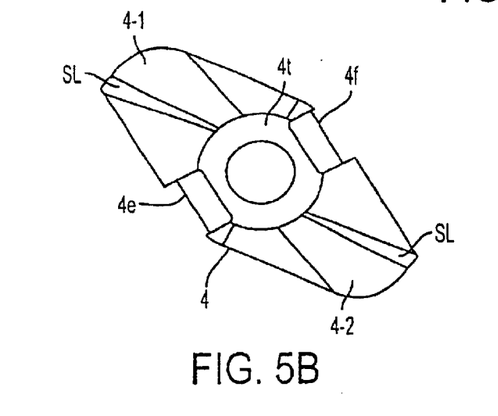
FIG. 5B is a view from above.
Figure 5C:
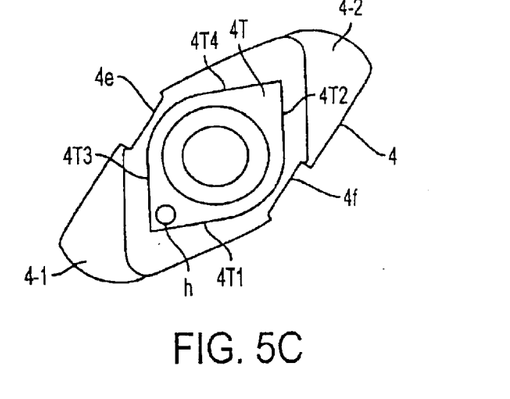
FIG. 5C is a view from below.

The locking element 4 also comprises a diamond-shaped shoulder 4T with side surfaces 4T1 and 4T2 on the visible front side and 4T3 and 4T4 at the back (see FIG. 5C). When the insert connection arrangement 2 is not connected with the retaining channel 1, the turning movement of the locking element 4 generated by the spiral torsion spring 6 is restricted by the side surfaces 4T1, 4T2, 4T3 and 4T4 striking the wall "y" of a corresponding recess (FIG. 8C) in the main body 2-4.

As shown in FIG. 4, the free end of the spring arm 5-1 of the ejection leaf spring 5 projects slightly from the locking element 4. The same applies for the spring arm 5-2 (not shown) at the back of the locking element.

FIG. 10 shows a perspective view of this ejection leaf spring 5 with a base part 5B and leaf-spring arms 5-1 and 5-2 angled diagonally outwardly. The base part 5B has a bore 5$h$ through which the rotation pin 3 passes. The ejection leaf spring 5 and its base part 5B are arranged in a form-fit in a recess of the locking part, in such a way that it turns with the locking part.

The top end of the spiral torsion spring 6, located on the rotation pin 3, is inserted into the hole "h" in the locking element. Its other end (not shown) rests against the wall of a recess in the main body.

Figure 5D:
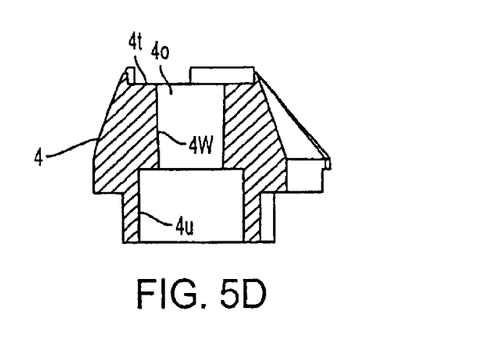
FIG. 5D is a section A—A shown in FIG. 5A.

FIGS. 5A to 5E show various views of the locking element 4 in various positions: FIG. 5A is a front view, FIG. 5B is a view from above, FIG. 5C is a view from below, and FIG. 5D is a section A—A view as shown in FIG. 5.

Figure 6:
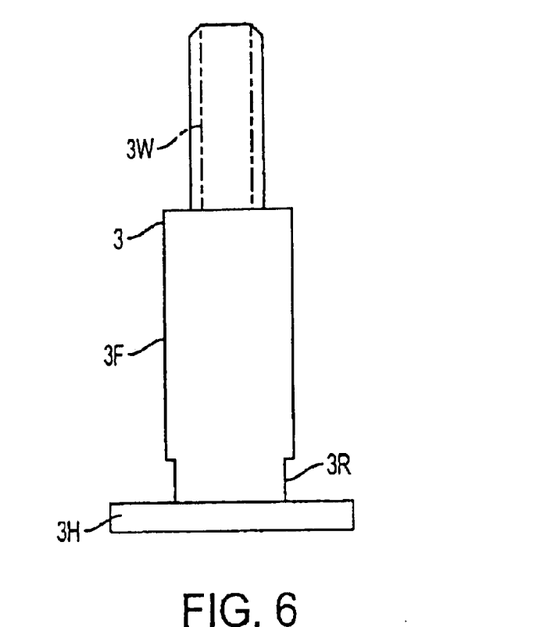
FIG. 6 is a side view of the rotation pin for the insert connection arrangement.

In these diagrams, as in FIG. 4, the wings are designated 4-1 and 4-2, the stop surfaces are designated 4S1 and 4S2, the diamond-shaped shoulder is designated 4T, and the side surfaces are designated 4T1, 4T2, 4T3 and 4T4. The purpose of bore "h" is to receive one end of the torsion spring 6. The bores 4$o$ and 4$u$ (FIG. 5D) receive the rotation pin 3 (FIG. 6). The lateral recesses 4$e$ and 4$f$ (FIG. 5B) and the upper recess 4$t$ (see also FIGS. 5B, 5C and 5D) receive the ejection leaf spring 5 in a form fit manner with the recess 4$t$ being sized to receive the base part 5B and with recesses 4$e$ and 4$f$ being sized to receive the spring-arm projections 5-1-and 5-2.

FIG. 6 shows the side view of the rotation pin 3 for the insert connection arrangement 2. The rotation pin 3 comprises a head 3H, a smooth shaft part 3F connected to it, and a threaded shaft section 3W of a smaller diameter. Arranged at the head 3H of the pin 3, is a turned recess 3R. When the pin 3 is assembled into the main body 2-4, a projection "v" on the main body 2-4 (FIG. 8B) fits into this recess 3R. This way of securing the pin 3 is made possible by the elastic characteristic of the material of the main body 2-4, i.e., when the pin 3 is pressed into the main body 2-4, the bores can expand temporarily until the projection "v" fits into the turned recess 3R.

The upper part of the locking part 4 (see FIG. 5D) has a bore 4$o$ with an interior thread 4W into which the threaded section 3W of the shaft 3 threads, i.e., the rotation pin 3 can be screwed into the bore 4$o$. In its lower part, the locking part 4 has a bore 4$u$ to receive the top part of the smooth section of the rotation pin 3F (FIG. 6).

The above describes only the way in which the insert connection arrangement 2 is inserted into and released from the retaining channel 1. On insertion, the pressure of the outer edges of the slot 1-1$e$ and 1-1$e'$ on the slide taper surfaces SL of the wings 4-1 and 4-2 against the force of the torsion spring 6 causes the locking element 4 to be turned back into a position which allows the locking element 4 to pass through the slot S in the retaining channel 1. However, as soon as the retaining edges have no further effect on the slide taper surfaces, the torsion spring 6 causes the locking element 4 to turn back into the locking position. In this position, the connection arrangement 2 cannot drop out or be pulled out of the retaining channel 1, although it can be pushed back and forward over its length, i.e., it can slide along the length of the channel 1. In order to make the connection between the insert connection arrangement 2 and the retaining channel 1 more secure, the exterior thread 3W of the rotation pin 3 (FIG. 6) can be screwed or tightened into the interior thread 4W (FIG. 5D) of the locking part 4. In this way, the wings 4-1 and 4-2 of the locking part 4 are pulled increasingly tightly against the insides of the retaining edges 1-1 and 1-2, and the retaining edges are clamped more and more securely between the holder 2-1 and the wings 4-1, 4-2, of the locking element 4.

Before detaching the insert locking arrangement 2 from the retaining channel 1, the screw connection must then be loosened to allow the locking part 4 to be turned into the non-locking position by turning the rotation pin 3 against the force of the torsion spring 6. However, in order to ensure that it is not possible to screw the rotation pin 3 entirely out of the locking part 4, a ring nut 7 is arranged above the ejection spring 5 on the rotation pin 3 and is connected securely with the rotation pin 3.

Figure 7:
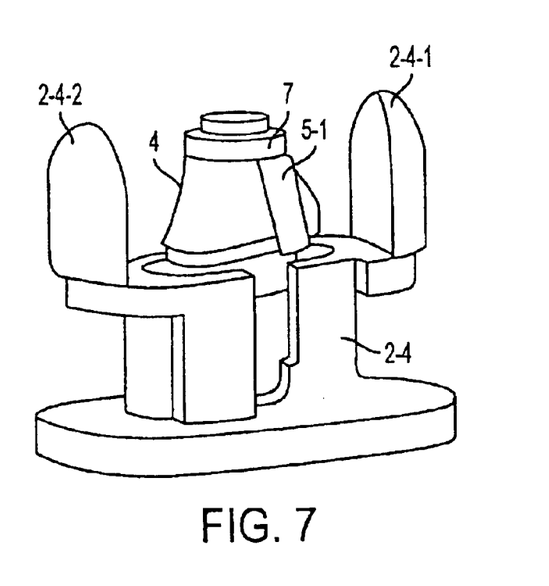
FIG. 7 shows a diagrammatic perspective view of the main body (without component-connection part and damping part)

FIG. 7 shows a diagrammatic perspective view of the main body 2-4 (without component-connection part and without damping part) with inserted rotation pin 3 with locking element 4.

FIGS. 8A to 8C show various views of the main body 2-4 comprising the holder 2-1 and the push-in part 2-2. FIG. 8A shows a front view of the main body, FIG. 8B shows a view of the main body from above, and FIG. 8C shows a section view of the main body as shown in section B—B in FIG. 8. These diagrams are intended to give a more detailed representation of the above-mentioned main body 2-4.

The main body is made in one part (i.e., one-piece) of plastic, preferably polyamide. Its purpose is to hold and guide the rotation pin 3 with the torsion spring 6. The locking element 4 is located at the top end of the rotation pin 3. A two part version of the main body is also contemplated by the invention. This design has the advantage of lower cost. The two parts can be made individually and thereafter connected, for example, by plug-in or welding processes.

The torsion spring 6 (not shown) is located in the recess "a" (of the main body 2-4 FIG. 8C). As mentioned above, one of their ends is connected with the locking element 4 while its other end rests on the wall of the recess. The recess "a" also receives the diamond shaped shoulder 4T of the locking element 4, in which the diamond shaped part 4T can be turned to a limited extent.

In order to restrict the turning movement of the locking part 4, the stop surfaces 4T1, 4T2, 4T3 and 4T4 of the diamond shaped part 4T strike appropriately formed sections of the wall "y" of recess "a". This restriction of the turning movement of the locking element 4 takes effect when the insert locking arrangement 2 is not connected with the retaining channel 1.

As in the other FIGS., the two guide elements of the main body are designated as 2-4-1 and 2-4-2. The main body 2-4 also serves to receive the component-connection part 2-3 shown in FIG. 3C and the damping part 2-5 shown individually in FIG. 9. The component-connection part is made preferably of plastic, in particular PEI (polyether imide).

FIGS. 9A to 9B show various perspective views of the damping part 2-5 for the holder wherein FIG. 9A shows a view diagonally from above and FIG. 9B shows a view diagonally from below.

The damping part 2-5 is made of a vibration-damping elastic material, preferably of silicone. In the assembled insert connection arrangement 2 (FIG. 1), the damping part 2-5 is arranged between the component-connection part 2-3 and the main body 2-4. This damping part 2-5 prevents the direct transmission of vibrations generated on the retaining channel side or the component side. They are damped, i.e. absorbed by the damping part 2-5. The damping part 2-5 has two buffers P1 and P2, which, when the retaining channel 1 and the insert connection arrangement 2 are joined, press against the lower side of the retaining edges 1-1, 1-2 of the retaining channel 1 (see also FIG. 1 and others). Through their elasticity, they not only serve to damp vibrations, but also serve to compensate tolerances in the assembly of the retaining channel 1 and the insert connection arrangement 2.

What is claimed:

1. A detachable insert connection arrangement adapted to be connected to a retaining channel having a slot between two retaining edges, the connection arrangement comprising:

a holder having a push-in part that includes a locking element;

the push-in part being capable of being pushed into the retaining channel;

a rotation pin coupled to the locking element;

the locking element being at least partially rotatable in two directions;

a spiral torsion spring that surrounds the rotation pin and that biases the locking element towards a locking position such that when the locking element is arranged in the retaining channel, the locking element bridges the slot and engages an inside of the two retaining edges; and the locking element being movable, upon movement of the rotation pin against a biasing force of the spring, to a non-locking position, whereby the push-in part can be removed from the retaining channel, wherein the locking element has two wings which resemble a propeller and each wing has a slide taper, and wherein, when the push-in part is pushed into the retaining channel, each slide taper is adapted to be pressed against the two retaining edges of the slot in such a way that the locking element can be turned against the biasing force of the spiral torsion spring into a position where the push-in part can be pushed through the slot.

2. The arrangement of claim 1, the holder comprises a part for connection to a component.

3. The arrangement of claim 1, wherein the push-in part comprises at least one guide element adapted to be fitted into the slot, whereby the at least one guide element acts to align the arrangement to the retaining channel.

4. The arrangement of claim 3, wherein the at least one guide element comprises two guide elements, and wherein the locking element is mounted to rotate about an axis arranged between the two guide elements.

5. A method of connecting a component to a retaining channel using the insert connection arrangement of claim 1, the method comprising:

inserting the push-in part into the retaining channel; and allowing the locking element to at least partially rotate until the locking element bridges the slot and engages an inside of the two retaining edges.

6. The method of claim 5, further comprising:

moving the rotation pin against a biasing force of the spiral torsion spring; and removing the push-in part from the retaining channel.

7. A method of connecting a component to a retaining channel using the insert connection arrangement of claim 1, the method comprising:

inserting the push-in part into the retaining channel;

allowing the locking element to at least partially rotate until the locking element bridges the slot and engages an inside of the two retaining edges; and rotating the rotation pin in one direction until the locking element clamps against an inside of the two retaining edges.

8. A method of detachably connecting the detachable insert connection arrangement of claim 1 to a retaining channel having a slot arranged between two retaining edges, the method comprising:

moving the push-in part towards the slot of the retaining channel;

pushing the push-in part into the retaining channel;

pressing each slide taper against the two retaining edges of the slot so that the locking element can be rotated against the biasing force of the spiral torsion spring; and allowing the locking element to rotate towards a locking position such that when the locking element is arranged in the retaining channel, the locking element bridges the slot and engages inside surfaces of the two retaining edges.

9. A method of detachably connecting the detachable insert connection arrangement of claim 1 to a retaining channel having a slot arranged between two retaining edges, the method comprising:

guiding the push-in part into the retaining channel;

pressing each slide taper against the two retaining edges of the slot so that the locking element can be rotated against the biasing force of the spiral torsion spring; and allowing the locking element to rotate towards a locking position such that when the locking element is arranged in the retaining channel, the locking element bridges the slot and engages inside surfaces of the two retaining edges.

10. A detachable insert connection arrangement adapted to be connected to a retaining channel having a slot between two retaining edges, the connection arrangement comprising:

a holder having a push-in part that includes a locking element;

the push-in part being capable of being pushed into the retaining channel;

a rotation pin coupled to the locking element;

the locking element being at least partially rotatable in two directions;

a spring that biases the locking element towards a locking position such that when the locking element is arranged in the retaining channel, the locking element bridges the slot and engages an inside of the two retaining edges; and the locking element being movable, upon movement of the rotation pin against a biasing force of the spring, to a non-locking position, whereby the push-in part can be removed from the retaining channel, wherein the rotation pin and the locking element are threadably connected to each other.

11. The arrangement of claim 10, wherein the locking element is capable of clamping against the inside of the retaining edges based upon relative movement between the rotation pin and the locking element.

12. A detachable insert connection arrangement adapted to be connected to a retaining channel having a slot between two retaining edges, the connection arrangement comprising:

a holder having a push-in part that includes a locking element;

the push-in part being capable of being pushed into the retaining channel;

a rotation pin coupled to the locking element;

the locking element being at least partially rotatable in two directions;

a spring that biases the locking element towards a locking position such that when the locking element is arranged in the retaining channel, the locking element bridges the slot and engages an inside of the two retaining edges;

the locking element being movable, upon movement of the rotation pin against a biasing force of the spring, to a non-locking position, whereby the push-in part can be removed from the retaining channel; and a double-armed ejector leaf spring.

13. The arrangement of claim 12, wherein the locking element is coupled to the double-armed ejector leaf spring, whereby the double-armed ejector leaf spring can be turned or rotated with the locking element.

14. The arrangement of claim 12, wherein the double-armed ejector leaf spring comprises spring arms which, in the non-locking position, press against edges of the slot in such a way that the arrangement can be pressed wholly or partially out of the slot.

15. A detachable insert connection arrangement adapted to be connected to a retaining channel having a slot between two retaining edges, the connection arrangement comprising:

a holder having a push-in part that includes a locking element;

the push-in part being capable of being pushed into the retaining channel;

a rotation pin coupled to the locking element;

the locking element being at least partially rotatable in two directions;

a spring that biases the locking element towards a locking position such that when the locking element is arranged in the retaining channel, the locking element bridges the slot and engages an inside of the two retaining edges;

the locking element being movable, upon movement of the rotation pin against a biasing force of the spring, to a non-locking position, whereby the push-in part can be removed from the retaining channel; and a damping part.

16. The arrangement of claim 15, wherein the damping part is mounted to the holder.

17. The arrangement of claim 15, wherein the damping part comprises damping buffers adapted to engage outer sides of the retaining edges when the arrangement is connected with the retaining channel.

18. A detachable insert connection arrangement adapted to be connected to a retaining channel having a slot between two retaining edges, the connection arrangement comprising:

a holder having a push-in part that includes a locking element;

the push-in part being capable of being pushed into the retaining channel;

a rotation pin coupled to the locking element;

the locking element being at least partially rotatable in two directions;

a spring that biases the locking element towards a locking position such that when the locking element is arranged in the retaining channel, the locking element bridges the slot and engages an inside of the two retaining edges; and the locking element being movable, upon movement of the rotation pin against a biasing force of the spring, to a non-locking position, whereby the push-in part can be removed from the retaining channel, wherein the locking element comprises stops that are adapted to engage edges of the slot, whereby the stops act to limit a turning or rotating movement of the locking element.

19. A detachable insert connection arrangement adapted to be connected to a retaining channel having a slot between two retaining edges, the connection arrangement comprising:

a holder having a push-in part that includes a locking element;

the push-in part being capable of being pushed into the retaining channel;

a rotation pin coupled to the locking element;

the locking element being at least partially rotatable in two directions;

a spring that biases the locking element towards a locking position such that when the locking element is arranged in the retaining channel, the locking element bridges the slot and engages an inside of the two retaining edges; and the locking element being movable, upon movement of the rotation pin against a biasing force of the spring, to a non-locking position, whereby the push-in part can be removed from the retaining channel, wherein the locking element comprises stops that are adapted to engage surfaces of a recess of the holder, whereby the stops act to limit a turning or rotating movement of the locking element.

20. A detachable insert connection arrangement adapted to be connected to a retaining channel having an opening and retaining edges, the connection arrangement comprising:

a holder having a first portion that is adapted to be inserted through the opening and a second portion adapted to be connected to a component;

a locking element which can at least partially rotate in each of a locking direction and an unlocking direction;

the locking element comprising wings having slide tapers and an edges which can releasably engage the retaining edges;

a pin coupled to the locking element;

a biasing mechanism that biases the locking element towards a locking position wherein the edges of the wings of the locking element can engage inside surfaces of the retaining edges;

the locking element being movable in the unlocking direction wherein the edges disengage from the inside surfaces of the retaining edges; and two guide elements arranged on opposite sides of the locking element and being adapted to be inserted through the opening, wherein the two guide elements project past the inside surfaces of the retaining edges when the wings of the locking element engage the inside surfaces of the retaining edges, and wherein, when the first portion is pushed into the retaining channel, each slide taper is adapted to be pressed against the retaining edges of the opening in such a way that the locking element can be turned against a biasing force of the biasing mechanism into a position where the first portion can be pushed through the opening.

21. A method of detachably connecting the detachable insert connection arrangement of claim 20 to a retaining channel having an opening arranged between retaining edges, the method comprising:

moving the first portion towards the opening of the retaining channel;

pushing the first portion and the two guide elements into the retaining channel;

pressing the slide tapers of the wings against the retaining edges to cause the locking element to be rotated against the biasing force of the biasing mechanism; and allowing the locking element to rotate towards a locking position such that when the locking element is arranged in the retaining channel, the locking element bridges the opening and engages inside surfaces of the retaining edges.

22. A method of detachably connecting the detachable insert connection arrangement of claim 20 to a retaining channel having an opening arranged between retaining edges, the method comprising:

guiding, with the two guide elements, the first portion into the retaining channel;

allowing the slide tapers of the wings to press against the retaining edges to cause the locking element to be rotated against the biasing force of the biasing mechanism; and allowing the locking element to rotate towards a locking position such that when the locking element is arranged in the retaining channel, the locking element bridges the opening and engages inside surfaces of the retaining edges.

23. A detachable insert connection arrangement adapted to be connected to a retaining channel having an opening and retaining edges, the connection arrangement comprising:

a holder having a first portion that is adapted to be inserted through the opening and a second portion adapted to be connected to a component;

a locking element which can at least partially rotate in each of a locking direction and an unlocking direction;

the locking element comprising wings;

the wings having slide tapers and edges which can releasably engage the retaining edges;

a pin extending though the holder and coupled to the locking element;

a biasing mechanism mounted about the pin and biasing the locking element towards a locking position wherein the edges of locking element can engage inside surfaces of the retaining edges;

the locking element being movable to the unlocking direction upon rotation of the pin in one direction whereby the edges of the wings disengage from the inside surfaces of the retaining edges; and the locking element being movable parallel at an axis of the pin and being rotatable to a clamping position wherein the edges of the wings clamp against the inside surfaces of the retaining edges; and two guide elements arranged on opposite sides of the locking element and being adapted to be inserted through the opening, wherein the two guide elements project past the inside surfaces of the retaining edges when the wings of the locking element engage the inside surfaces of the retaining edges, and wherein, when the first portion is pushed into the retaining channel, each slide taper is adapted to be pressed against the retaining edges of the opening in such a way that the locking element can be rotated against a biasing force of the biasing mechanism into a position where the first portion can be pushed through the opening.

24. A method of detachably connecting the detachable insert connection arrangement of claim 23 to a retaining channel having an opening arranged between retaining edges, the method comprising:

moving the first portion towards the opening of the retaining channel;

pushing the first portion and the two guide elements into the retaining channel;

pressing the slide tapers of the wings against the retaining edges to cause the locking element to be rotated against the biasing force of the biasing mechanism; and allowing the locking element to rotate towards a locking position such that when the locking element is arranged in the retaining channel, the locking element bridges the opening and engages inside surfaces of the retaining edges.

25. A method of detachably connecting the detachable insert connection arrangement of claim 23 to a retaining channel having an opening arranged between retaining edges, the method comprising:

guiding, with the two guide elements, the first portion into the retaining channel;

allowing the slide tapers of the wings to press against the retaining edges to cause the locking element to be rotated against the biasing force of the biasing mechanism; and allowing the locking element to rotate towards a locking position such that when the locking element is arranged in the retaining channel, the locking element bridges the opening and engages inside surfaces of the retaining edges.

* * * * *